G. GARDNER.

CHAIR-SEAT.

No. 7,203. Reissued July 4, 1876.

Witnesses:
L. Van Pelsurick
A. G. Stuart

Inventor:
George Gardner
per
S. Hannay
Atty.

UNITED STATES PATENT OFFICE.

GEORGE GARDNER, OF BROOKLYN, NEW YORK, ASSIGNOR, BY MESNE ASSIGNMENTS, TO HIMSELF, WILLIAM GARDNER, AND JANE E. GARDNER.

IMPROVEMENT IN CHAIR-SEATS.

Specification forming part of Letters Patent No. 127,045, dated May 21, 1872; reissue No. 7,203, dated July 4, 1876; application filed April 8, 1876.

*To all whom it may concern:*

Be it known that I, GEORGE GARDNER, of the city of Brooklyn, county of Kings, and State of New York, have invented a new and useful Improvement in the Bottoms of Seats; and I do hereby declare that the following is a full, clear, and exact description thereof, which will enable those skilled in the art to which my invention relates to construct the same, reference being had to the accompanying drawing, and to the letters of reference marked thereon.

Figure 1:
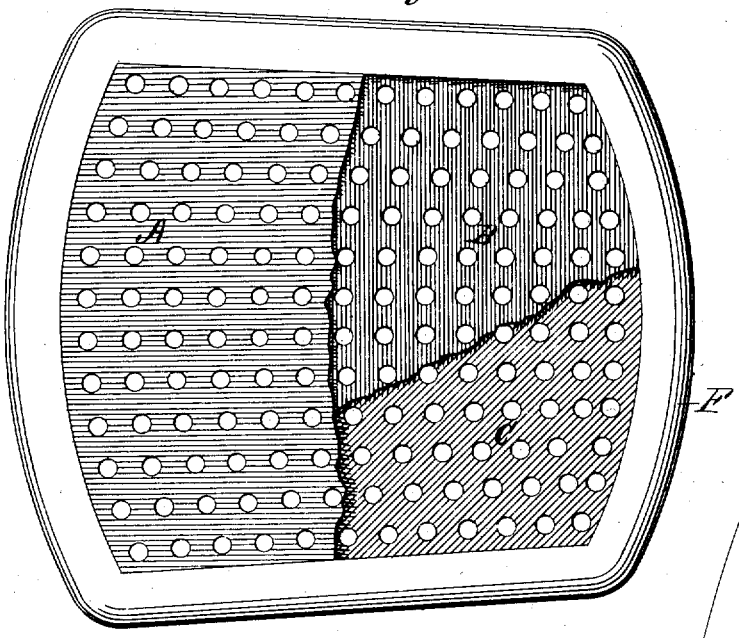
Figure 2:
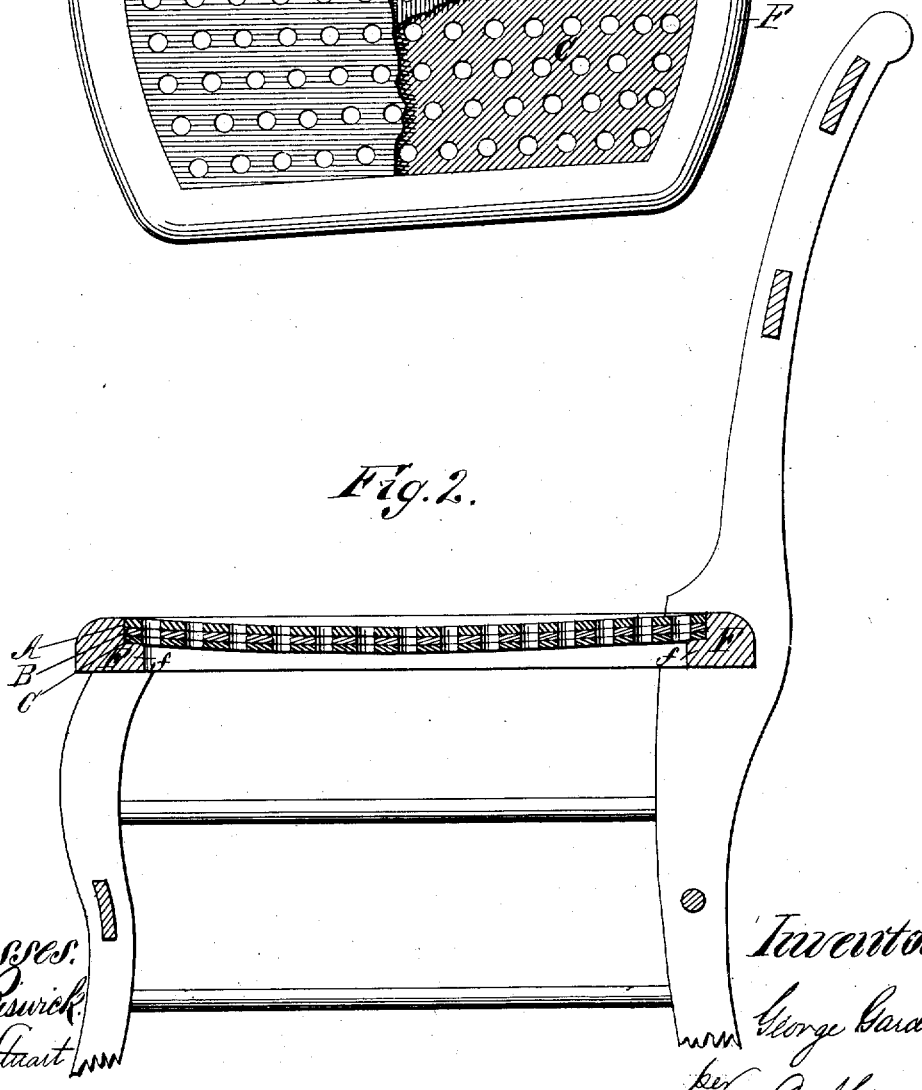

Figure 1 is a plan view, partly in section, of my improved seat, the section showing the middle layer of veneer. Fig. 2 is a view of my improved seat for chairs, settees, &c., this figure showing a longitudinal section of the seat, taken on the line *x x* of Fig. 1.

Similar letters of reference refer to like parts in both of the figures.

This invention relates to bottoms for seats; and consists in constructing the said seats of two or more veneers of wood, with the grains crossing each other, the said veneers of wood being glued together by an adhesive substance.

I have shown in the drawing accompanying this specification three layers of veneer, applied to the construction of and forming a seat for chairs. These layers of veneer are represented by the letters A, B, and C. The grain of veneer A crosses that of veneer B, as shown in section in Fig. 1, and the grain of veneer B crosses that of veneer C, as seen in Fig. 2. Veneers, when thus arranged—that is to say, with the grains crossing each other, or diversified—will make a seat which, for durability and economy, will be found to be a very useful improvement.

I make the seat either solid or perforated, as shown in Fig. 1. A slight concave configuration may be given to the seat.

The perforated seats are made by boring a round hole of any design desired; and they may be bored either by hand or by machinery adapted for the purpose.

The perforated seats are desirable, as they are ventilated and ornamental.

I have especially shown and described my improved seat for chairs. The veneers of which this seat is constructed rest upon a shoulder, *f*, of a frame, F, which surrounds them, as shown in Fig. 2 of the drawing. The veneers, with the grains crossed or diversified and glued together, become homogeneous, thus making a solid piece of wood, from which I make the bottom of the seat, which, when perforated and varnished, is ready for the market.

Veneers, when thus arranged—that is to say, with the grain running crosswise or in diverse directions—will make a bottom for a seat which, for economy and durability, will be found to be a very useful improvement. The bottoms thus made may be left solid, or perforated after some design agreeable to the fancy of the one having them made. A slightly-concave configuration may be given to the bottom, as shown in Fig. 2, which greatly adds to the comfort of the party using it. The bottom thus made is secured to a frame, F, which surrounds it, and through the latter is secured to the seat-frame K.

Having thus described my invention, what I claim is—

1. As a new article of manufacture, a bottom for a seat, constructed of two or more veneers or thin layers of wood, with the grain of the one layer crossing that of the other, and the whole secured together with an adhesive substance, substantially as set forth.

2. As a new article of manufacture, a bottom for a seat-frame, constructed of two or more veneers or thin layers of wood, with the grain of the one layer crossing that of the other, said layers being secured together by an adhesive substance, and having perforations formed therein for the purpose of ventilation or ornamentation, substantially as set forth.

3. The combination of a seat-bottom, constructed of two or more veneers or thin layers of wood, with the grain of the one layer crossing that of the other, and the whole secured together by an adhesive substance, with the frame of the seat, substantially as set forth.

4. The combination of a seat-bottom, constructed of two or more veneers or thin layers of wood, the grain of the one layer crossing that of the other, and the whole secured together by an adhesive substance, and provided with perforations for the purpose of ventilation or ornamentation, with the frame of a seat, substantially as set forth.

5. As a new article of manufacture, a wooden bottom for seats, provided with perforations for the purpose of ventilation or ornamentation.

6. As a new article of manufacture, a seat-bottom constructed of two or more veneers or thin layers of wood, the grain of the one layer crossing that of the other, and secured together by an adhesive substance, said bottom thus formed having a curved or concave configuration on its upper side, substantially as set forth.

In testimony whereof I have signed my name to this specification of my invention in the presence of two attesting witnesses this 6th day of March, 1876.

GEO. GARDNER.

Witnesses:

CHARLES G. COE,
LOUIS W. FROST.